United States Patent [19]

Beckon

[11] Patent Number: 4,765,811

[45] Date of Patent: Aug. 23, 1988

[54] TOP REMOVAL FILTER CARTRIDGE

[76] Inventor: Weir E. Beckon, 10166 Boone Cir., Bloomington, Minn. 55438

[21] Appl. No.: 109,195

[22] Filed: Oct. 16, 1987

[51] Int. Cl.$^4$ .............................................. B01D 46/24
[52] U.S. Cl. ........................................ 55/498; 55/501; 55/502; 55/508
[58] Field of Search .................................. 55/497–499, 55/501, 502, 508, 510, 518; 210/323.1, 323.2, 493.2, 493.5

[56] References Cited

U.S. PATENT DOCUMENTS

| | | | |
|---|---|---|---|
| 3,160,488 | 12/1964 | Wilber | 55/501 |
| 3,320,727 | 5/1967 | Farley et al. | 55/502 X |
| 3,535,853 | 10/1970 | Brown et al. | 55/508 X |
| 3,616,618 | 11/1971 | Gronholz et al. | 55/498 X |
| 3,785,129 | 1/1974 | Szmutko | 55/510 X |
| 4,073,632 | 2/1978 | Reinauer et al. | 55/498 X |
| 4,138,234 | 2/1979 | Kubesa | 55/498 X |
| 4,222,755 | 9/1980 | Grotto | 55/502 X |
| 4,233,042 | 11/1980 | Tao | 55/499 X |
| 4,605,426 | 8/1986 | Thornburgh | 55/510 X |
| 4,680,118 | 7/1987 | Taga | 55/499 X |
| 4,692,177 | 9/1987 | Wright et al. | 55/499 |
| 4,704,144 | 11/1987 | LeBlanc et al. | 55/502 X |
| 4,720,292 | 1/1988 | Engel et al. | 55/498 X |

FOREIGN PATENT DOCUMENTS 623352 7/1961 Canada .................. 55/510

Primary Examiner—Robert Spitzer
Attorney, Agent, or Firm—Schroeder & Siegfried

[57] ABSTRACT

The elimination of a caulking step in the manufacture of filters which mount and are suspended from a top mounting floor by modifying the end cap thereof such that a top removal plate and an end plate which comprise the end cap are constructed to each have depending portions which cooperatively define a channel which sealably receives and connects to the filter medium. A seam between the top removal plate and end plate, which previously was sealed through a separate caulking step, is effectively sealed simultaneously with the pre-existing necessary adherence of the filter medium within the channel of the end cap.

14 Claims, 2 Drawing Sheets

TOP REMOVAL FILTER CARTRIDGE

BACKGROUND OF THE INVENTION

This invention relates to filters which are top mounted and suspended from a mounting floor which has a plurality of apertures for receiving such filters. Such filters normally carry a "top removal plate," which is a term of art for a plate member which is connected to the top of the filter and extends beyond the outer confines of the filter, and is used to mount the filter to the mounting floor.

A conventional cylindrical-type top mounting filter generally has a top end plate which carries the top removal plate. The end plate is generally ring-shaped, having an inner edge corresponding with the inner diameter of the ring and an outer edge corresponding with the outer diameter of the ring. Generally, both the inner and the outer edges of the end plate are flanged or bent downwardly toward the filter medium thereby creating an inverted channel in which the filter medium rests. The filter medium is supported within the channel of the end plate by means of an adhesive which is used to adhere the edges of the filter medium to the end plate. Thus, the inner flanged edges of the end plate correspond with and form a part of the bore of the filter through which the cleaned air exits.

The top removal plate on a conventional top removal filter is also ring-shaped and has a central bore which is substantially the same diameter as the channel of the filter. The top removal plate is merely spot welded on the top surface of the end plate, and thus, there is a seam which runs between the end plate and the top removal plate where leakage of dust particles and other impurities may occur. When using conventional filters of this type, a common procedure is to run a bead of caulking around the inner or outer edge of the end plate where the seam exists between the top face of the end plate and the top removal plate to prevent the dust particles from leaking therebetween.

However, this procedure is both inefficient and costly. There is a long-felt need for a filter where the leakage path between the top removal plate and the end plate can be effectively eliminated without performing the extra time-consuming and costly procedure of caulking the seam around the perimeter of the end plate where the end plate meets the surface of the top removal plate.

The construction of the invention described in the present application eliminates the need for caulking the seam around the perimeter of the end plate, and is thereby a clear improvement over the conventional prior art.

SUMMARY OF THE INVENTION

The top end plate of a conventional top removal filter, which is ring-shaped and has a U-shaped crosssectional configuration, forms a channel for receiving and supporting the filter medium. The channel has inner and outer sidewalls which are comprised of the inner flanged edge and the outer flanged edge, respectively, of the ring-shaped end plate. It will be noted that with a conventional filter of this type the top removal plate which is carried by the end plate, and is also ring-shaped, does not have a flanged inner edge corresponding to the inner diameter of its ring-shape.

By contrast, with the improved construction of the end cap, which is the subject matter of this invention, the channel for receiving the filter medium is now defined by inner and outer sidewalls wherein the inner sidewall is formed by an inner flanged edge of the top removal plate, and the outer sidewall of the channel is formed by the outer flanged edge of the end plate. By constructing the end cap of the filter in such a manner the inner flanged edge of the top removal plate will telescopically engage the end plate through its central bore and actually comprise a portion of the inner walls of the filter.

Thus, the channel supporting the filter medium is defined by portions of both the top removal plate and the end plate, and a seam is created within the channel between the inner edge of the end plate and the inner flanged edge of the top removal plate. By adhering the filter medium within the channel formed by the top removal plate and the end plate which comprise the end cap, which is a necessary step in the construction of all such filters, the adhesive which is used to secure the filter medium to the end cap also effectively seals the seam created between the end plate and top removal plate, thereby preventing any dust from leaking between the two plates into the cleaned air portion of the filtering system.

Thus, it is clear that by constructing the end cap of the top removal filter is such a manner, the seam between the two plates is automatically sealed as a part of the otherwise required act of adhering the filter medium to the end cap. The need for caulking around the outer edge of the end plate has been effectively eliminated, thus making the construction of such filters much more efficient, and at a much lower cost.

DETAILED DESCRIPTION OF THE INVENTION

Only when a person has a full understanding of the problems inherent in a conventional type top removal filter can the importance of the invention herein be fully appreciated. Therefore, the initial part of this disclosure focuses upon the construction of a conventional type top removal filter and the problems inherent therewith. Once these problems have been described, the subject matter of this invention will be disclosed and more fully appreciated.

Figure 1:
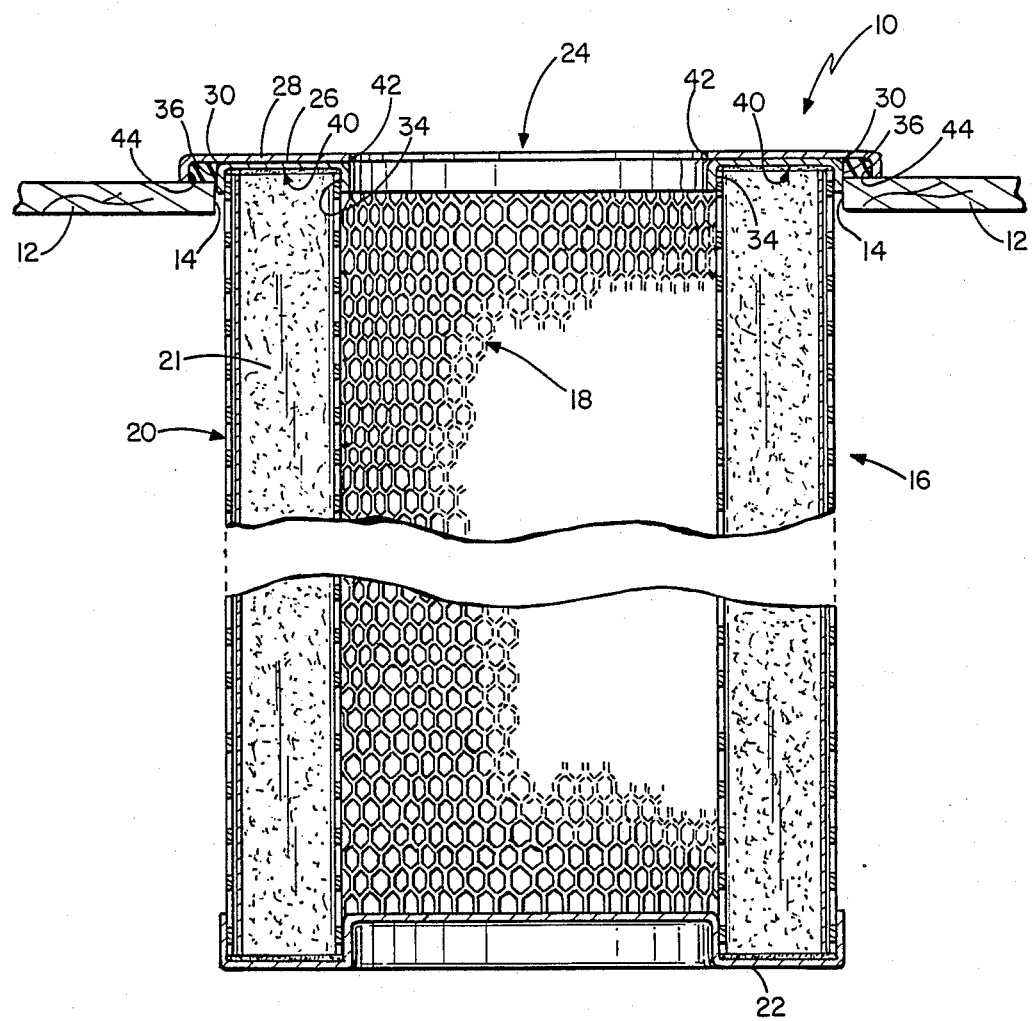
FIG. 1 shows a vertical cross-section, with parts broken away, of a conventional top removal air filter being suspended from a mounting floor through an aperture therein, and further showing the end plate having a generally U-shaped cross-sectional configuration and the top removal plate being carried thereby.

Shown in FIG. 1 is a conventional type top removal filter 10 which is adapted for being connected to a mounting floor 12 and suspended therefrom through aperture 14. Generally, filter 10 is constructed of a perforated housing 16 which includes a perforated metal inner core cylinder 18 and a perforated metal outer body cylinder 20. A filter medium 21 is disposed between the inner core cylinder 18 and outer body cylinder 20, and a pair of end caps constituting a bottom end cap 22 and a top end cap 24 encloses the area between the inner core cylinder 18 and outer body cylinder 20, thereby supporting the housing 16 and the filter medium 21.

The subject matter of this invention relates to the construction of the top end cap 24 of filter 10 which functions to enclose the filter medium 21 within the housing 16, and also to act as a mounting plate for connecting the same to mounting floor 12. The end cap 24 shown in FIGS. 1 and 2 includes a ring-shaped end plate 26 and a ring-shaped top removal plate 28. The top removal plate 28 is spot welded to the end plate 26 at various intervals about its circumference, thereby creating a seam 30 between the top face of end plate 26 and the bottom face of top removal plate 28.

As stated above, the conventional construction of the top end cap 24 includes an end plate 26 which is essentially ring-shaped. Thus, end plate 26 is necessarily a disc, having a central bore therethrough. The conventional ring-shaped end plate 26 consequently has an inner edge 34 and an outer edge 36 which correspond to its inner surface diameter and its outer surface diameter, respectively. The inner edge 34 and the outer edge 36 of end plate 26 are both flanged or bent downwardly toward the filter medium 21 and housing 16.

Thus, the cross-sectional configuration of end plate 26 is generally U-shaped, thereby creating a channel 38 which is constructed and arranged to receive and cap housing 16 which contains the filter medium 21. The inner flanged edge 34 and the outer flanged edge 36 of the end plate 26 constitutes the inner sidewall and the outer sidewall which define the channel 38 that is formed by end plate 26.

As stated above, channel 38 receives the housing 16 and the filter medium 21. More particularly, channel 38 receives the inner core cylinder 18 and the outer body cylinder 20, with the filter medium 21 being disposed therebetween. The end plate 26 which forms channel 38 acts as a cap which encloses the filter medium 21 between the outer body cylinder 20 and the inner core cylinder 18 of housing 16. The filter medium 21 is adhesively connected to the base of channel 38 (shown in FIG. 1 at point 40). It will be noted that the base end cap 22 has a similar cross-sectional configuration as end plate 26 has, and sealably receives the lower end of housing 16 and filter medium 21.

To facilitate mounting the removal filter 10 to a mounting floor 12, top removal plate 28 is connected to the top face of end plate 26 by spot welding or other suitable means. The top removal plate 28 shown in FIG. 1 is also ring-shaped, having a central bore therethrough which is similar in dimensions to the central bore through end plate 26.

However, the top removal plate 28 has a larger outer diameter than end plate 26 and extends radially outward beyond the outer confines of end plate 26, thereby forming a lip which engages the mounting floor 12 and supports the filter 10 which is suspended therefrom.

Top removal plate 28 also has an inner edge 42 and an outer edge 44 which corresponds to its inner diametrical surface and outer diametrical surface, respectively. The inner edge 42 of the top removal plate 28 is not flanged, but the outer edge 44 of the top removal plate 28 is slightly flanged downwardly toward the mounting floor. A second channel 46, shown in FIG. 2, is defined between the outer slightly flanged edge of top removal plate 28 and the outer flanged edge 36 of end plate 26 which establishes an area therebetween wherein a sealing gasket 48 is carried to minimize the amount of dust leakage through seam 30 between the end plate 26 and the top removal plate 28.

Figure 2:
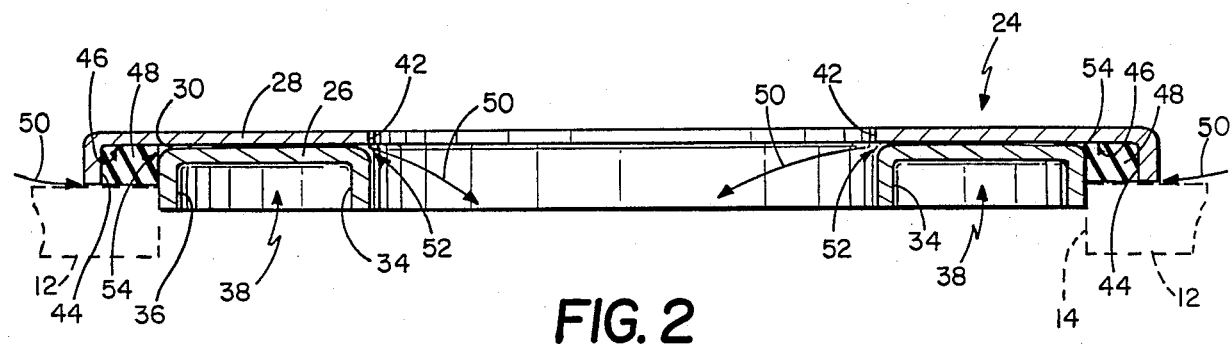
FIG. 2 shows a fragmentary vertical sectional view on an enlarged scale of the end cap of the top removal filter shown in FIG. 1, and further showing the direction of the leakage path therethrough.

However, as can be most clearly seen in FIG. 2, considerable leakage of dust particles may still occur even though the sealing gasket 48 is used. The leakage path, designated by lines 50 in FIG. 2, enters underneath the outer flanged edge 44 of the top removal plate 28, and between the gasket 48 and the mounting floor 12. The dust particles and other impurities are then sucked up through seam 30 between the top removal plate 28 and the end plate 26, thereby entering the central core of the filter 10 where the clean air is to exit.

In order to prevent such leakage of dust particles and other impurities into the cleaned air of filter 10, conventionally, a seal has been formed with an ahdesive or other suitable material along seam 30 at the point where the inner edge 34 of end plate 26 and the inner edge 32 of top removal plate 28 meet (designated by point 52). Alternatively, the seal has been located along the line where the outer flanged edge 36 of the end plate 26 bends downwardly away from the top removal plate 28 (designated by point 54).

Using the conventional type end cap 24 for the top removal filter 10 necessarily requires the added step of creating a seal such as shown at points 52 or 54 in order to prevent leakage of dust and other impurities through seam 30. This added step is extremely inefficient in that it increases the time required to manufacture the end cap 24, and it is also costly in terms of money. With these problems regarding the construction of a conventional type top removal filter 10 kept in mind, it is now possible to effectively disclose the marked improvement made by the new construction of the end cap over the conventionally constructed end cap 24.

Figure 3:
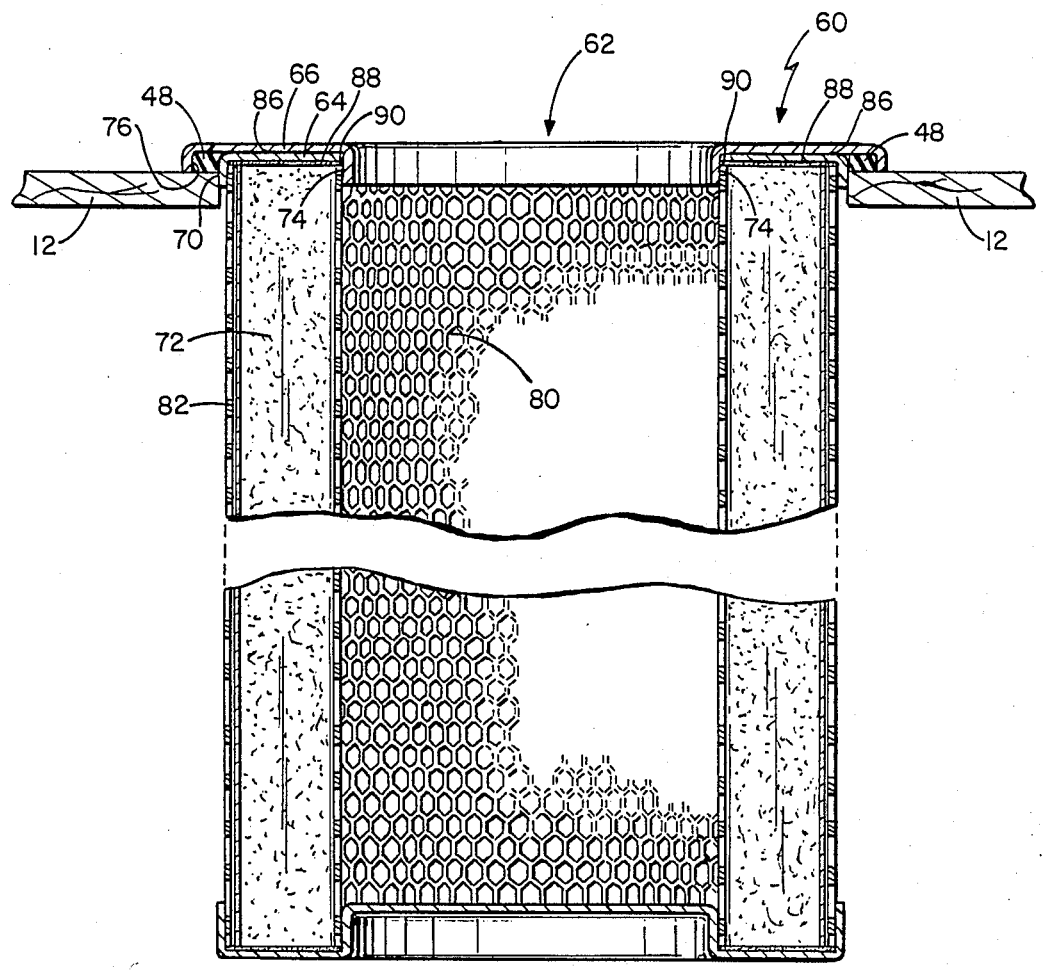
FIG. 3 is a vertical cross-sectional view of my improved top removal filter being suspended from a mounting floor and showing the top end cap wherein both the top removal plate and the end plate now have a generally L-shaped cross-sectional configuration.
Figure 4:
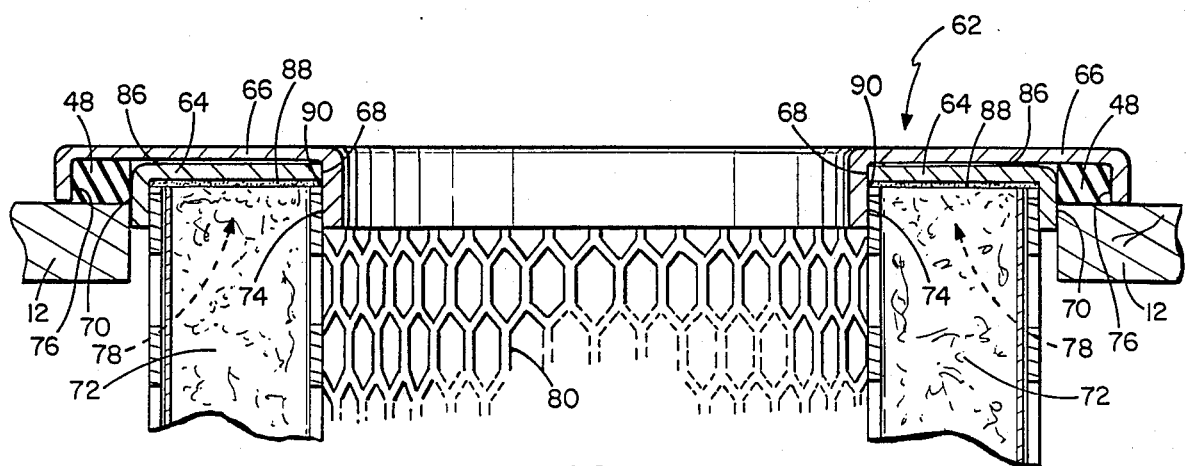
FIG. 4 is an enlargement of the top portion of my improved top removal filter shown in FIG. 3 illustrating the construction of the improved end cap comprised of the end plate and the top removal plate, and further showing the seam therebetween which is sealed.

As shown in FIGS. 3 and 4, the major difference between the conventional type filter 10 and the new improved top removal filter 60 is the improved construction of end cap 62. As best shown in FIG. 4, end cap 62 is comprised of end plate 64 and top removal plate 66. The end plate 64 is generally ring-shaped and has an L-shaped, rather than U-shaped, cross-sectional configuration when the cross-section is taken from its inner diametrical edge 68 to its outer diametrical edge 70. In the improved construction of end plate 64 the outer edge 70 is still flanged downwardly toward the filter medium of filter 60. However, unlike the conventional end plate 26, the inner edge 68 of end plate 64 is not flanged downwardly towards the filter medium 72.

The top removal plate 66 is also ring-shaped and has an inner diametrical edge 74 and outer diametrical edge 76. The improved top removal plate 66 has its inner edge 74 flanged downwardly towards the filter medium 72. Because the outer edge 76 of the top removal plate 66, shown in FIG. 4, is also slightly flanged toward the filter medium 72, the top removal plate 66 maintains a generally U-shaped cross-sectional configuration when the cross-section is taken from its flanged inner edge 74 to its outer diametrical edge 76.

The top removal plate 66 engages the end plate 64 in such a manner that the inner flanged edge 74 of the top removal plate 66 is telescopically disposed through the inner core of the ring-shaped end plate 64 adjacent the inner diametrical edge 68 of end plate 64. By so doing, the inner flanged edge 74 of the top removal plate 66 defines the inner sidewall of channel 78, the outer sidewall of channel 78 being defined by the outer flanged edge 70 of end plate 64. Similar in function to the channel 38 defined by the end plate 26 on a conventional end cap 24 (shown in FIGS. 1 and 2), the function of channel 78 on the improved end cap 62 is to receive and sealably connect to the filter medium 72 which is disposed between inner core cylinder 80 and outer body cylinder 82 of the improved top removal filter 60.

The top removal plate 66 and the end plate 64 are connected together by spot welding or other suitable means at intervals about their circumference. The interconnection of top removal plate 66 and end plate 64 form a seam 86 therebetween. It is this seam 86 which must be properly sealed in order to prevent dust or other impurities from entering the cleaned air which has been filtered through the top removal filter 60.

As can be seen in FIG. 4, the sealing of seam 86 is accomplished simultaneously with the necessary sealing of the filter medium 72 to the end cap 62 within channel 78. The filter medium 72 is connected within channel 78 to the end plate 64 and the inner flanged edge 74 of the top removal plate 66 with an epoxy or plastisol 88. This epoxy or plastisol 88 not only adheres the filter medium 72 to the end plate 64 and top removal plate 66, but at the same time it seals the seam 86 at point 90. Point 90 is the innermost point of seam 86 adjacent to where the inner diametrical edge 68 of end plate 64 meets the inner flanged edge 74 of the top removal plate 66.

Thus, it is easily seen that the seam 86 between the top removal plate 66 and end plate 64 is effectively sealed at the same time and by the same act or step by which the filter medium 72 is adhered to the end cap 62. Since both the seam 86 and the connection of the filter medium 72 to the end cap 62 must be sealed to prevent dust leakage, unlike the manufacturing of a conventional-type top removal filter 10 as shown in FIGS. 1 and 2, manufacturing an improved top removal filter 60 requires no additional step to seal the seam 86 between the top removal plate 66 and end plate 64. By simply adhering the filter medium 72 within channel 78 formed by the end cap 62 of the improved top removal filter 60, (where the adhering step is required, anyhow) the seam 86 between the top removal plate 66 and the end plate 64 will be sealed, thereby preventing any dust from entering the core of the filter where the cleaned air exits.

It will be noted that the outer diametrical edge 76 of the top removal plate 66 extends outwardly beyond the outer confines of the end plate 64. As with the conventional-type top removal filter, this is necessary in order for the top removal plate 66 to engage the mounting floor 12, and to support the improved top removal filter 60 therefrom. The outer diametrical edge 76 of the top removal plate 66 is also bent slightly downwardly towards the mounting floor 12 so as to accomodate and receive a conventional sealing gasket 48 between the outer edge 76 of the top removal plate and the outer flanged edge 70 of the end plate 64.

The disclosure above relates to cylindrically shaped filters having annular end caps therefor. The inventive matter of this disclosure is not limited to the filter configuration above, but may also apply to other configurations. In considering this invention, it should be remembered that the present disclosure is illustrative only and the scope of the invention should be determined by the appended claims.

I claim:

1. A filtering device for cleaning air passing therethrough which is constructed to be mounted from a top mounting floor comprising:
   (a) a filter medium;
   (b) a permeable filter housing, including a base end cap, which contains said filter medium and supports the same;
   (c) an end plate carried by said housing and being constructed and arranged to support said housing and said filter medium; and
   (d) a top removal plate carried by said end plate of the filtering device and constructed and arranged to form a channel between edge portions of said top removal plate and said end plate for receiving said filter medium of the filtering device, said filter medium being sealably connected to said end plate and said top removal plate, and forming a seal thereby between said end plate and said top removal plate to prevent impurities from leaking between said end plate and said top removal plate.

2. The structure defined in claim 1, wherein said channel is further defined by an inner sidewall and an outer sidewall, said inner sidewall constituting said edge portions of said top removal plate and being an integral part of said top removal plate, and said outer sidewall constituting said edge portions of said end plate and being an integral part of said end plate carried by said housing.

3. The structure defined in claim 1, wherein said top removal plate and said end plate each have a central opening therein forming an inner edge and an outer edge on each, said inner edge of one of said plates being flanged in a direction toward said filter medium of the filtering device, and said outer edge of said other plate being flanged in a direction toward said filter medium of the filtering device, said plates being constructed and arranged in an engaging relationship to form said channel between said flanged edges of said plates.

4. A filter adapted for being mounted and suspended from a mounting floor, and for sealing against the same, said filter comprising:
   (a) a filter medium;
   (b) a permeable filter housing having ends and being constructed and arranged to contain said filter medium;
   (c) a pair of end caps constituting a base end cap and a top end cap, said end caps being sealably connected to said filter medium and constructed and arranged to cover said ends of said filter housing, thereby enclosing the area containing said filter medium;
   (d) said top end cap being further comprised of an end plate and a top removal plate wherein said plates have cooperative channel difining portions, and said plates being constructed and arranged to fixedly engage one another so as to form a channel for receiving said filter medium; and
   (e) said channel being defined by a pair of sidewalls wherein one of said sidewalls is integrally formed from said channel defining portions of said top removal plate and said other sidewall is integrally formed from said channel defining portions of said end plate.

5. The structure defined in claim 4, wherein said end plate and said top removal plate are constructed and arranged to be in a sealed relationship to one another as a result of the sealed connection between said filter medium and said top end cap, thereby preventing contamination from entering the filter cartridge between said top removal plate and said end plate.

6. The structure defined in claim 4, wherein said top removal plate and said end plate are ring-shaped, each having a central bore therethrough, wherein at least an inner edge constituting the inner diameter portion of said top removal plate is flanged in a direction toward said filter medium, thereby forming one of said sidewalls, and an outer edge constituting the outer diameter portion of said end plate is flanged in a direction toward said filter medium, thereby forming said other sidewall.

7. The structure defined in claim 6, wherein said inner flanged surface of said top removal plate telescopically engages said end plate through said central bore in said end plate, thereby forming said channel between said inner flanged edge of said top removal plate and said outer flanged edge of said end plate.

8. The structure defined in claim 4, wherein said top removal plate and said end plate have central bores therethrough, said top removal plate having a generally U-shaped cross-sectional configuration and said end plate having a generally L-shaped cross-sectional configuration when a cross-section of each said plate is taken from their respective bore to their respective outer perimeter.

9. A filter adapted for being mounted and suspended from a mounting floor, and for sealing against the same, said filter comprising:
(a) a filter medium;
(b) a permeable filter housing having ends and being constructed and arranged to support said filter medium;
(c) said filter housing including a base end cap which sealably connects to said filter medium; and
(d) a top end cap being comprised of a top removal plate and an end plate, said top end cap being constructed and arranged to cover one end of said housing and sealably connect to said filter medium, and said top removal plate and said end plate being further constructed and arranged to be connected together and to form a seal therebetween, said plates being sealed together by the connection between said filter medium and said plates comprising said end cap, thereby preventing impurities from entering the cleaned air by leaking between said end plate and said top removal plate.

10. The structure defined in claim 9, wherein each of said plates have a bore therethrough to allow escape of the clean filtered substances, each said plate thereby having an inner edge adjacent said respective bore and an outer edge constituting the perimeter of each said respective plate.

11. The structure defined in claim 10, wherein at least said inner edge of said top removal plate is flanged toward said filter medium, and said outer edge of said end plate is flanged in the same direction as said inner edge of said top removal plate, said flanged inner edge of said top removal plate being telescopically disposed through said core of said end plate, thereby forming a channel between said flanged inner edge of said top removal plate and said flanged outer edge of said end plate.

12. The structure defined in claim 11, wherein a seam is formed between said flanged inner edge of said top removal plate and said inner edge of said end plate which is sealed to prevent dust from entering the cleaned air from the filter by an adhesive used when said filter medium is adhered to said end plate and top removal plate which comrpise said end cap.

13. The structure defined in claim 11, wherein said end plate carries said top removal plate, whereby said flanged inner edge of said top removal plate is telescopically disposed through said bore of said end plate and sid outer edge of said top removal plate extends outwardly beyond said outer flanged edge of said plate and is constructed and arranged to engage the mounting floor onto which such a filter cartridge is mounted.

14. The structure defined in claim 13, wherein said outer edge of said top removal plate is slightly flanged toward said filter medium, said end cap being constructed and arranged to carry a flexible gasket between said outer flanged edge of said top removal plate and said outer flanged edge of said end plate to provide an additional seal between said top removal plate and the mounting floor.

* * * * *

UNITED STATES PATENT AND TRADEMARK OFFICE
CERTIFICATE OF CORRECTION

PATENT NO. : 4,765,811
DATED : August 23, 1988
INVENTOR(S) : Weir E. Beckon

It is certified that error appears in the above-identified patent and that said Letters Patent is hereby corrected as shown below:

column 2, line 27, change"is"to"in"

column 3, line 10, "encloses" should read "enclose"

column 6, line 63, "difining" should read "defining"

column 7, line 35, "to" should be inserted between "mounted" and "and"

column 8, line 31, "comrpise" should read "comprise"

column 8, line 36, "sid" should read " said"

Signed and Sealed this

Twenty-eighth Day of March, 1989

Attest:

DONALD J. QUIGG

*Attesting Officer*　　　*Commissioner of Patents and Trademarks*